United States Patent
Galstyan

(10) Patent No.: US 10,648,452 B1
(45) Date of Patent: May 12, 2020

(54) VERTICAL AXIS WIND TURBINE

(71) Applicants: Viktor Galstyan, Charentsavan, Kotayk (AM); Tigran Gichunts, Marstons Mills, MA (US)

(72) Inventor: Viktor Galstyan, Kotayk (AM)

(73) Assignees: Viktor Galstyan, Charentsavan (AM); Tigran Gichunts, Marstons Mills, MA (US)

( * ) Notice: Subject to any disclaimer, the term of this patent is extended or adjusted under 35 U.S.C. 154(b) by 0 days.

(21) Appl. No.: 16/255,179

(22) Filed: Jan. 23, 2019

(51) Int. Cl.
*F03D 3/00* (2006.01)
*F03D 3/04* (2006.01)
*F03D 3/06* (2006.01)
*F03D 9/11* (2016.01)
*F03D 9/25* (2016.01)
*F03D 7/06* (2006.01)

(52) U.S. Cl.
CPC .......... *F03D 3/005* (2013.01); *F03D 3/0409* (2013.01); *F03D 3/061* (2013.01); *F03D 9/11* (2016.05); *F03D 9/25* (2016.05); *F03D 7/06* (2013.01); *F05B 2240/12* (2013.01); *F05B 2240/211* (2013.01); *F05B 2240/301* (2013.01); *F05B 2260/42* (2013.01)

(58) Field of Classification Search
CPC ... F03D 3/005; F03D 9/11; F03D 9/25; F03D 3/0409; F03D 3/061
See application file for complete search history.

(56) References Cited

U.S. PATENT DOCUMENTS

| | | | |
|---|---|---|---|
| 4,449,053 A | 5/1984 | Kutcher | |
| 5,380,149 A * | 1/1995 | Valsamidis | ........... F03D 3/0427 415/2.1 |
| 5,391,926 A | 2/1995 | Staley et al. | |
| 5,499,904 A | 3/1996 | Wallace et al. | |
| 6,465,899 B2 | 10/2002 | Roberts | |
| 7,329,965 B2 | 2/2008 | Roberts et al. | |
| 7,573,148 B2 | 8/2009 | Nica | |
| 8,043,499 B2 | 10/2011 | Saeed et al. | |
| 8,096,773 B2 | 1/2012 | Chang | |
| 8,128,337 B2 | 3/2012 | Pezaris | |
| 8,282,236 B2 | 10/2012 | Pelken et al. | |
| 9,243,611 B2 | 1/2016 | Song et al. | |
| 9,255,567 B2 | 2/2016 | Farb et al. | |
| 9,284,943 B2 | 3/2016 | Zha et al. | |
| 9,284,944 B2 | 3/2016 | Yoon | |
| 9,284,945 B2 | 3/2016 | Brendle | |
| 9,303,623 B2 | 4/2016 | Wygnanski | |
| 9,328,717 B1 | 5/2016 | Walker | |

(Continued)

*Primary Examiner* — Viet P Nguyen
(74) *Attorney, Agent, or Firm* — Bay State IP, LLC

(57) ABSTRACT

A vertical axis wind turbine includes a cylindrical rotor with a plurality of convex-concave blades placed in a stator which directs the wind stream. The VAWT is installed vertically towards a surface of the ground, and wherein, the stator and the rotor are formed of vertically located blades which may have numerous geometric forms. Both the stator and rotor blades have a leading edge and a trailing edge, and each blade of the stator possesses a top end that is fastened to an immobile upper plate of the stator, and a bottom end that is fastened to a lower plate of the stator. In this embodiment, each blade of the rotor includes a top end fixed to an upper plate, while a bottom end of the each blade is fixed to a lower plate.

19 Claims, 14 Drawing Sheets

(56) References Cited

U.S. PATENT DOCUMENTS

| | | |
|---|---|---|
| 9,404,474 B2 | 8/2016 | Watanabe |
| 9,453,495 B2 | 9/2016 | Coffey |
| 9,464,623 B2 | 10/2016 | Liu |
| 9,534,581 B2 | 1/2017 | Vaz |
| 9,537,371 B2 | 1/2017 | Appa |
| 9,598,758 B2 | 3/2017 | Devitt |
| 2002/0109358 A1* | 8/2002 | Roberts ................. F03D 3/0409 290/54 |
| 2004/0219019 A1* | 11/2004 | Taylor ................... F03D 3/0409 416/132 B |
| 2006/0275105 A1* | 12/2006 | Roberts ................. F03D 3/061 415/4.2 |
| 2010/0003130 A1* | 1/2010 | Gual ....................... F03D 3/061 415/191 |
| 2010/0213722 A1* | 8/2010 | Scott ..................... F03D 3/0409 290/55 |
| 2013/0113217 A1* | 5/2013 | Vaz ....................... F03D 3/0409 290/55 |
| 2013/0115069 A1* | 5/2013 | Zha ....................... F03D 3/0409 415/191 |
| 2013/0294918 A1* | 11/2013 | Jaquier ................... F03B 13/10 416/179 |
| 2014/0050586 A1 | 2/2014 | Chio |

\* cited by examiner

VERTICAL AXIS WIND TURBINE

BACKGROUND OF THE INVENTION

Field of the Invention

The present disclosure relates generally to wind turbines, and more specifically to vertical axis wind turbines, which are installed vertically to the ground surface, and wherein the arrangement of the stator and rotor blades allow for an increase in power and efficiency.

Description of the Related Art

There exist several vertical axis wind turbines capable of producing electricity, however many take power from local grids when wind speeds are not suitable for producing electricity or when low temperatures require the turbines to spin in order to avoid damage from freezing.

The principles of the operation of wind turbines is as follows: the wind blows on the surfaces of the blades and the corresponding vacuum that arises within the turbine creates a force which while acting on the blades makes it to go round a central shaft, and thus driving a rotor of an electric generator. Normally, a wind turbine is installed on a tower in order to get a great effect from the wind, thereby seeking to achieve the maximum energy output possible.

In classic constructions, the wind turbine normally consists of a cylindrical rotor with convex-concave blades, which rotate in the stator that directs the wind stream. The most wide-spread wind turbines have a relatively minimal capacity (0.1-5 kV). As such, the usage of these turbines is economically reasonable for the energy supply of autonomous consumers who are removed from the electrical transmission lines.

In use, vertical axis wind turbines possessing a rotating capacity in the range of 0.1-5 kV are generally utilized for the mechanization of painstaking works in the agriculture, for example, water-lifting, irrigation, steel water-pipes cathode protection, illumination and heating of industrial and leaving spaces.

Vertical axis wind turbines (VAWT) have blades, located on the vertical axis of rotation; the generator and the directing equipment are situated on the ground, which facilitates their maintenance and repair. The structural simplicity of the VAWT and the form of the blades allows the wind turbines to bear the strong blows of wind while in operation. In contrast to the horizontal axis wind turbines, VAWT do not have moving parts for rotation along the direction of the wind.

One deficiency of vertical axis wind turbines is the ineffective transmission of the kinetic energy to mechanical energy for the electric energy generation, along with the necessity to use its own generator as a motor for wind turbine detwisting at initial startup for the purpose of which electrical current, generated from the local network, is being used. Unlike other turbines the wind turbines have relatively little impact on the environment, and there is a certain anxiety related to the noise in the result of rotor blade operation, work reliability, esthetic (visual) impact on people.

SUMMARY OF THE INVENTION

The instant system, as illustrated herein, is clearly not anticipated, rendered obvious, or even present in any of the prior art mechanisms. Thus, the several embodiments of the instant system are illustrated herein.

A primary object of the vertical axis wind turbine system is to provide a completely self-sufficient wind turbine that is capable of storing and utilizing sufficient power to spin in order to avoid damage from freezing, and to start-up without taking electricity from local grids.

Another object of the vertical axis wind turbine system is to provide a more efficient blade design, which increases the system's conversion energy efficiency. This enables the user to install a smaller turbine without the need of a crane or heavy equipment, greatly reducing the cost of installation and maintenance.

Another primary object of the vertical axis wind turbine system is to receive wind speed from any direction of up to 60 m/s.

Another primary object of the vertical axis wind turbine is to implement a stator blade design that protects the rotor blades from potentially harmful debris.

In one embodiment a vertical wind turbine is disclosed and comprised of a plurality of stator immobile blades in order to ensure the acceleration of a wind stream to a plurality of rotor blades, and during the rotation of blades which may be fixed to a generator for electrical power generation. The quantity of stator and rotor blades may be changed depending on the generator type. In this embodiment, the stator blades accelerate the air stream and direct it to the rotor blades.

Another object of the vertical axis wind turbine is to provide an increased energy conversion efficiency (ECE), and reliability of wind turbines during times of electric energy generation at lower wind speeds, along with providing a decrease in the overall size and weight of the VAWT.

In another embodiment, a vertical axis wind turbine comprises a cylindrical rotor with a plurality of convex-concave blades placed in a stator which directs the wind stream. The VAWT is installed vertically towards a surface of the ground, and wherein, the stator and the rotor are formed of vertically located blades which may have numerous geometric forms. Both the stator and rotor blades have a leading edge and a trailing edge, and each blade of the stator possesses a top end that is fastened to an immobile upper plate of the stator, and a bottom end that is fastened to a lower plate of the stator. In this embodiment, each blade of the rotor includes a top end fixed to an upper plate, while a bottom end of the each blade is fixed to a lower plate.

The surface of each rotor blade is made respectively of a top (positive) part of the rotor's blade edgy profile, having one hundred percent relative thickness. Conversely, a surface of each stator blade is made respectively of a bottom (negative) part of the edgy profile, deposed along a horizontal axis. In this embodiment, the blades are placed along the rotor and stator radius evenly on one line in the horizontal plane and with a minimal gap in the vertical plane; the leading edge of the rotor blade surface is the continuation of the trailing edge of the stator blade surface. As such, an edgy profile butt is formed on one axial line along the radius in static position; the stator and rotor blades are perpendicular to the rotation axis along with having an identical length and equal in quantity.

Another object of the vertical axis wind turbine is having the blade external surface and internal surface are identical along the whole outline, the leading edge of the stator blade surface defines the external diameter of the wind turbine, equal to the scale of chord size reduction of edgy profile's bottom (negative) part.

Another object of the vertical axis wind turbine comprises a rotor brake is located in the bottom part of the body, at the end of the wind rotor shaft, wherein the wind turbine rotor blocks are ready-fitted are directly installed on the axial bearing.

Yet another object of the vertical axis wind turbine provides a structure in the form of truncated pyramid serves as a foundation for wind turbine, the lateral surfaces of the structure have a possibility to open and close and are equipped with a set of solar panels.

The vertical axis wind turbine is an advanced turbine having stator immobile blades, wherein the blades are positioned correspondingly to the bottom part of the edgy profile, which increases the efficiency and acceleration of the wind stream to the direction of rotating blades of the rotor. In conjunction, the rotor blades are located correspondingly to the top parts of the edgy profile to ensure the rotation of the rotor during low wind speed for the generation of electric power. The stator blades may be merged along the horizontal axis to accelerate the air stream and direct it to the working surface of the rotor blades, thereby ensuring the maximum pressure on the surface of the blades. In this embodiment, the rotor is connected to the generator through a belt transmission.

The construction of the above embodiment form of the blades and their relative location allows for the decrease the overall size of the wind turbine, reduces the level of noise, and possesses a symmetric structure form that facilitates the operation of the vertical axis wind turbine with wind from any direction even at low speeds.

Yet another object of the vertical access wind turbine is that a rotor junction is located on a support bearing and installed on a turbine body that bears the rotor junctions for other blocks.

In this embodiment, in order to accelerate the air stream the blades are evenly located along the rotor and stator radius on one line in horizontal plane and with minimal gap in vertical plane.

Preferably, the vertical axis wind turbine is able to receive and transform wind streams up to any speed up to 60 m/s independent of the direction of the wind, without any adjusted operation. The turbine may have a modular componentry which assumes that the turbine's capacity may be increased through the modification of the turbine's height, along with the pressure of identical modules of the rotor and stator.

Furthermore, in another embodiment, the absence of a reduction gear on the rotor shaft increases the turbine reliability, ensuring its high economical efficiency. The generator and equipment of control are on approximately one to fifteen meters above the surface of the ground, thereby forming a truncated pyramid.

Yet another object of the vertical axis wind turbine is the simplicity of installation and technical maintenance to allow a technician to dismantle the turbine and install it in another place without the use of any lifting cranes.

Additionally, it is another object of the vertical axis wind turbine, is that it is ecologically safe, as it does not have external rotating elements, and for its installation small territories are needed, about 2.5-3 m². The leading and the trailing edges of the stator blades are located so that they are a screen and protect the rotor junction from undesirable elements.

Yet another a distinctive feature of present invention is that the geometric shape of the stator blade is a continuation of the rotor blade displaced along the horizontal axis. The relative arrangement of the blades contributes to the increase in wind speed, and the shape of the rotor blade provides the maximum working surface area of the rotor blade, thus increasing the power and efficiency factor.

The vertical axis wind turbines efficiency increase, as well as the increase of energy conversion efficiency, energy generation on low speeds of wind, small overall sizes and eight, as well as the reliability are actual to date.

In one embodiment, the rotor block is not adjustable, and the quantity of stator and rotor blades depends on overall dimensions and capacity of wind turbine. The generator type does not depend on the quantity of blades and is selected by capacity for a particular turbine.

An edgy profile butt (end) is $C_{max}$ along the whole length of blades, in the given version the edgy profile butt $C_{max}$=100 mm, the rotor butt by height is 70 mm, the stator butt by height is 30 mm. FIGS. 4A & 4B discussed below show how the wind flow flows around the butt of the stator blade and accelerates, meets with the butt of the rotor blade, flows around and passes into the inner surface of the neighboring rotor blade, ensuring the rotation of the rotor.

The minimal gap between the rotor and stator blades depends on the rotor and stator fabrication and adjustment (assemblage) certainty, in the practically fabricated example of the FIG. 4 the gap between the rotor and stator blades is 2-2.5 mm.

In this embodiment, the external diameter of the stator block is 400 mm, the height of the rotor and stator block is the same and is 500 mm. In the given version, the rotor and stator blades are made of metal plate with smooth bright surface with covering.

Again, in FIGS. 4A & 4B, the blades have leading edge, trailing edge, the trailing edge 3 of rotor blade is fast connected (assembly) to the turbine vertical shaft along the whole length of the blade (500 mm), the leading edge of the rotor blade surface is the continuation of the trailing edge of the stator blade surface on one axial line along the radius in static position, forming edgy profile butt.

One of the most important aspects is that the rotor blade surface is manufactured adequately to the upper (positive) part of the edgy profile, and the stator blade surface adequately to the bottom (negative) part of the edgy profile, displaced along the horizontal axis (shown in FIG. 6). It means that rotor blade surface and stator blade surface have the same shape that the edgy profile graphic, they are identical and exactly coincide along the whole length, repeat the shape of the edgy profile.

In one embodiment, attention must be paid to the fact that the shape of the stator blades ensures the airflow along the wind direction line, it is shown by arrows and contributes to the wind speed increase in the space between the stator blades, directing the total energy of wind to the internal surface of the rotor blade. The proposed shape increases the efficiency of the energy conversion on the account of the fact that on the rotor blade surface the flow speed decreases, and the pressure increases, the rotor blade shape itself has maximal work area.

The simplicity of the structure, the absence of a reduction gear as well as the protective shield, created by the stator and rotor blades, ensure the safe operation of the wind turbine.

The present invention allows to develop wind turbines with a capacity of up to 100 kW and more; of course, the increase in capacity will result also in the increase of overall dimensions and weight of the wind turbine.

Other purposes and advantages of the present invention will become obvious from the wind turbine structure description according to the attached drawings, which represent an example of the present invention realization and fabrication. All the drawings, forms, included in this document, are a part of the given description and include one of dimension types of the present invention realization.

BRIEF DESCRIPTION OF THE DRAWINGS

Advantages of the present apparatus will be apparent from the following detailed description of exemplary embodiments thereof, which description should be considered in conjunction with the accompanying drawings, in which, having thus described the system in general terms, reference will now be made to the accompanying drawings, which are not necessarily drawn to scale, and wherein.

DETAILED DESCRIPTION OF THE SEVERAL EMBODIMENTS

Figure 1A:
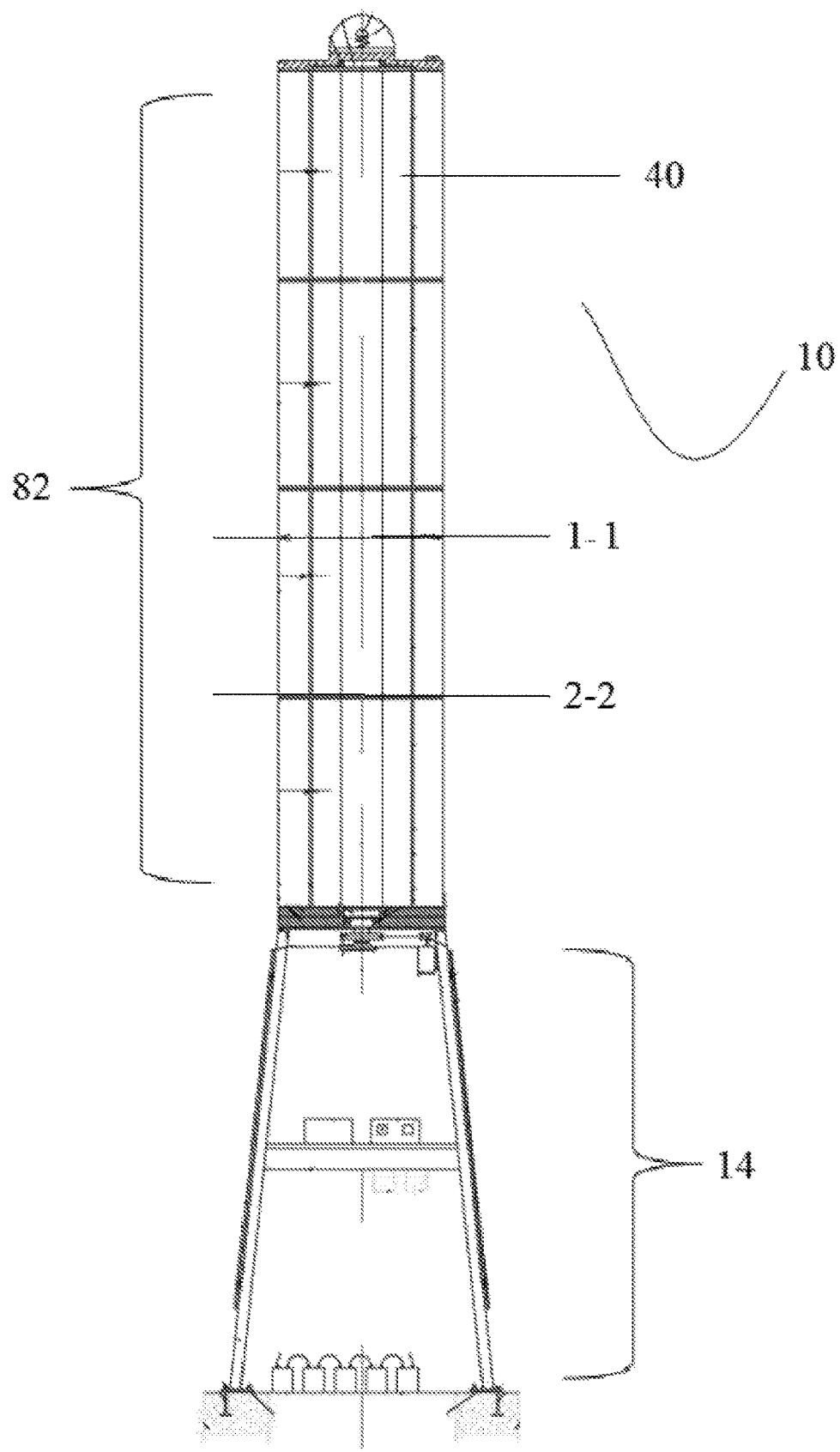
FIG. 1A is a front view of one embodiment of a fully assembled vertical axis wind turbine.
Figure 1B:
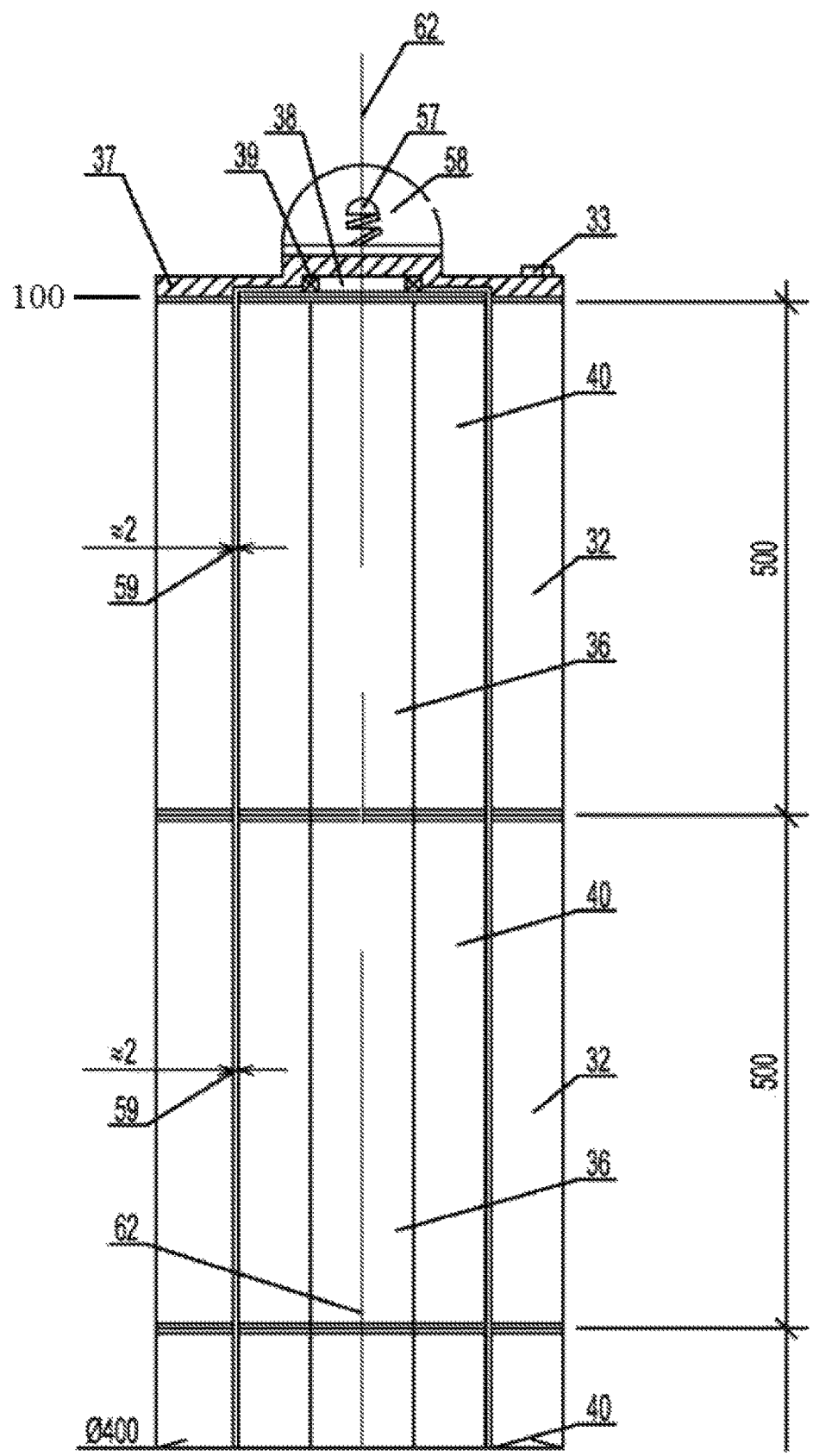
FIG. 1B is an enlarged view of a top half of the vertical axis wind turbine along line 1-1.

The detailed description set forth below in connection with the appended drawings is intended as a description of presently preferred embodiments of the apparatus and does not represent the only forms in which the present apparatus may be constructed and/or utilized. The description sets forth the functions and the sequence of steps for constructing and operating the apparatus in connection with the illustrated embodiments. However, it is to be understood that the same or equivalent functions and sequences may be accomplished by different embodiments that are also intended to be encompassed within the spirit and scope of the invention.

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings wherein like reference numerals indicate like elements throughout the several views. The drawings, which are not necessarily to scale, depict illustrative embodiments of the claimed invention.

FIG. 1A illustrates one embodiment of a vertical axis wind turbine (VAWT) 10, wherein the VAWT 10 includes a set of rotor blocks 40 arranged along a vertical axis 82. In this embodiment, the VAWT 10 includes four rotor blocks 40, however the amount of rotor blocks 40 present in the VAWT 10 may vary depending on the specific use, location and need for the VAWT 10 and the wind conditions present wherein the VAWT 10 is located. Furthermore, the VAWT 10 preferably includes a foundation 14 which acts as a base for the VAWT 10 and supports the set of rotor blocks 40.

FIG. 13 illustrates a longitudinal view of the top half of the VAWT 10 shown along line 1-1 in FIG. 1A. The set of rotor blocks 40 are interconnected through a set of screws 26 (see FIG. 2) between each individual rotor block 40; an uppermost rotor block 40 is fixed on an end of a flanged shaft 38 through a set of flanged shaft screws 35 (see FIG. 2). In this embodiment, the flanged shaft 38 enters into a tube 36, wherein the tube 36 extends from a top 100 of the uppermost rotor block 40 to a bottom 102 of the lowermost rotor block 40; the tube 36 is preferably empty of devoid of a shaft. Additionally, a set of stator blocks 32 are interconnected through the set of screws 26 (see FIG. 2), wherein the stator blocks 32 are motionlessly connected to a closure head 18 (see FIG. 2) through the set of screws 26. Preferably a gap 59 between the rotor blocks 40 and the stator blocks 32 is two millimeters.

A closure 37 is motionlessly fixed on a last upper block of the stator 32 through a set of bolts 33. The flanged shaft 38 which enters into the tube 36 contained within the set of rotor blocks 40 centralizes the uppermost rotor block 40 to allow it to rotate within a bearing 39. Additionally, an upper ring 60 (see FIG. 3A) is fixed on an end of the flanged shaft 38 through the set of flanged shaft screws 35 at the uppermost rotor block 40.

A beacon 58 may be located on the closure 37 to characterize a height of the VAWT 10, wherein the beacon 58 includes an LED lamp 57 to illuminate the presence of the VAWT 10.

Figure 1C:
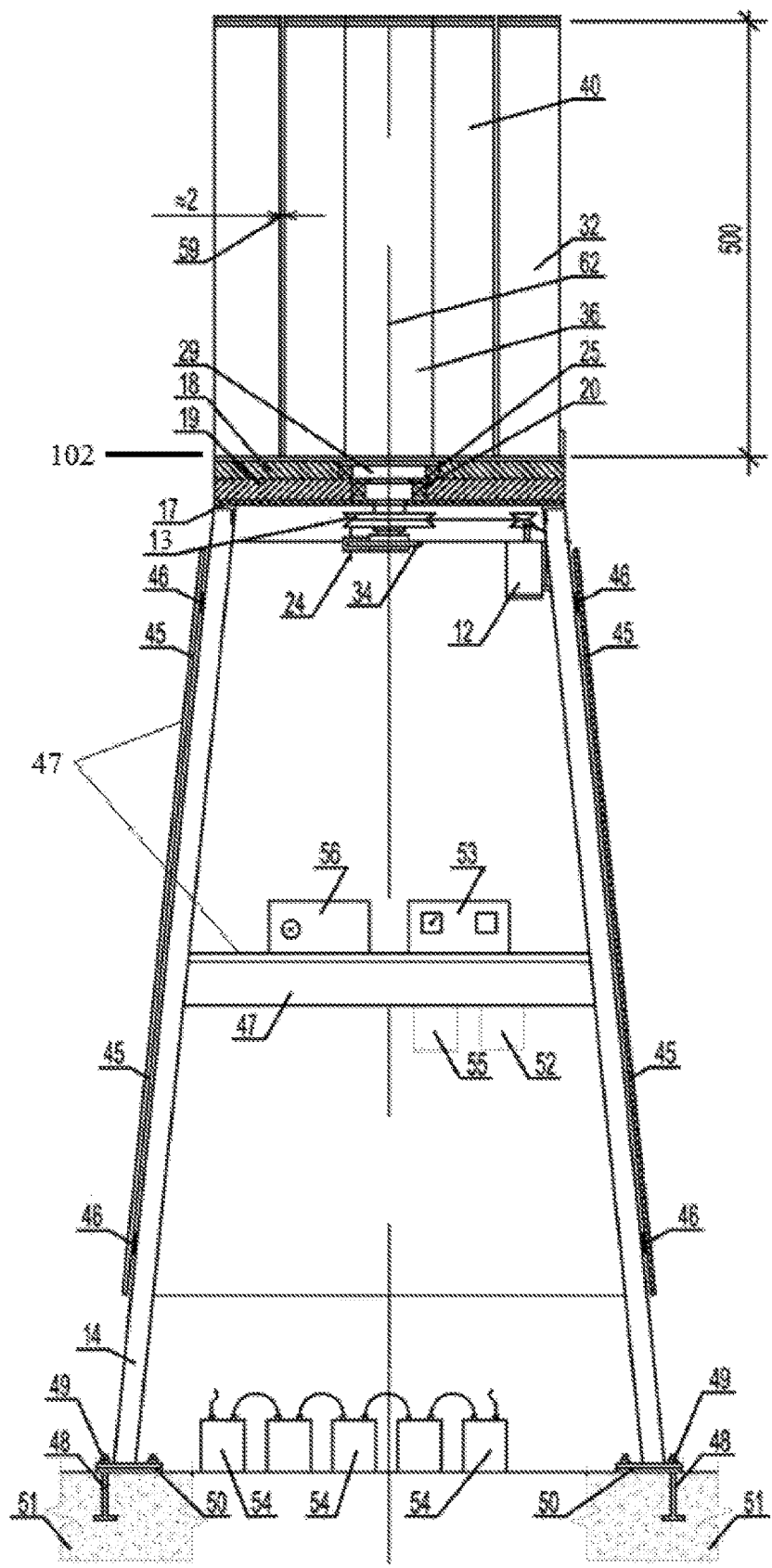
FIG. 1C is an enlarged view of a bottom half of the vertical axis along line 2-2.

FIG. 1C illustrates a longitudinal view of the bottom half of the VAWT 10 shown along line 2-2 in FIG. 1A. In this embodiment, the foundation 14 preferably comprises a quadrangular truncated pyramid, which further comprises an assembly of metallic channel bars 47, welded to each other through a foundation ring 17. A series of insert-fixing-plates 50 anchor the foundation 14 to the ground by means of a set of anchor nuts 49 and a set of anchor bolts 48 secured in a concrete cast 51. Preferably, a plurality of solar panels 45 are attached on all four sides of the foundation 14 and rotate about a hinge pin 46, which enables the solar panels 45 to be lifted up to reveal the inner contents of the foundation 14.

In this embodiment, the electric power generated by the solar panels 45 is transferred to a first controller 55; part of the electric power transferred to the first controller 55, may then pass through an inverter 56 to be utilized by a consumer while the remaining power is directed to a series of accumulators 54, where may store the additional power. Separately, a generator 12 is located within the foundation 14 and the electricity generated from the VAWT 10 via the generator 12 passes through a converter 53 and into a second controller 52, where it may be accessed by a consumer for a variety of purposes. Any electrical power that is not immediately used by the consumer is stored in the series of accumulators 54. When the generator 12 is not producing power due to, for example, low wind speed or temperature, the electric current from the inverter 56 or from the accumulators 54 passes to the generator 12 to power the turbine to slowly spin so as to prevent damage.

Figure 1D:
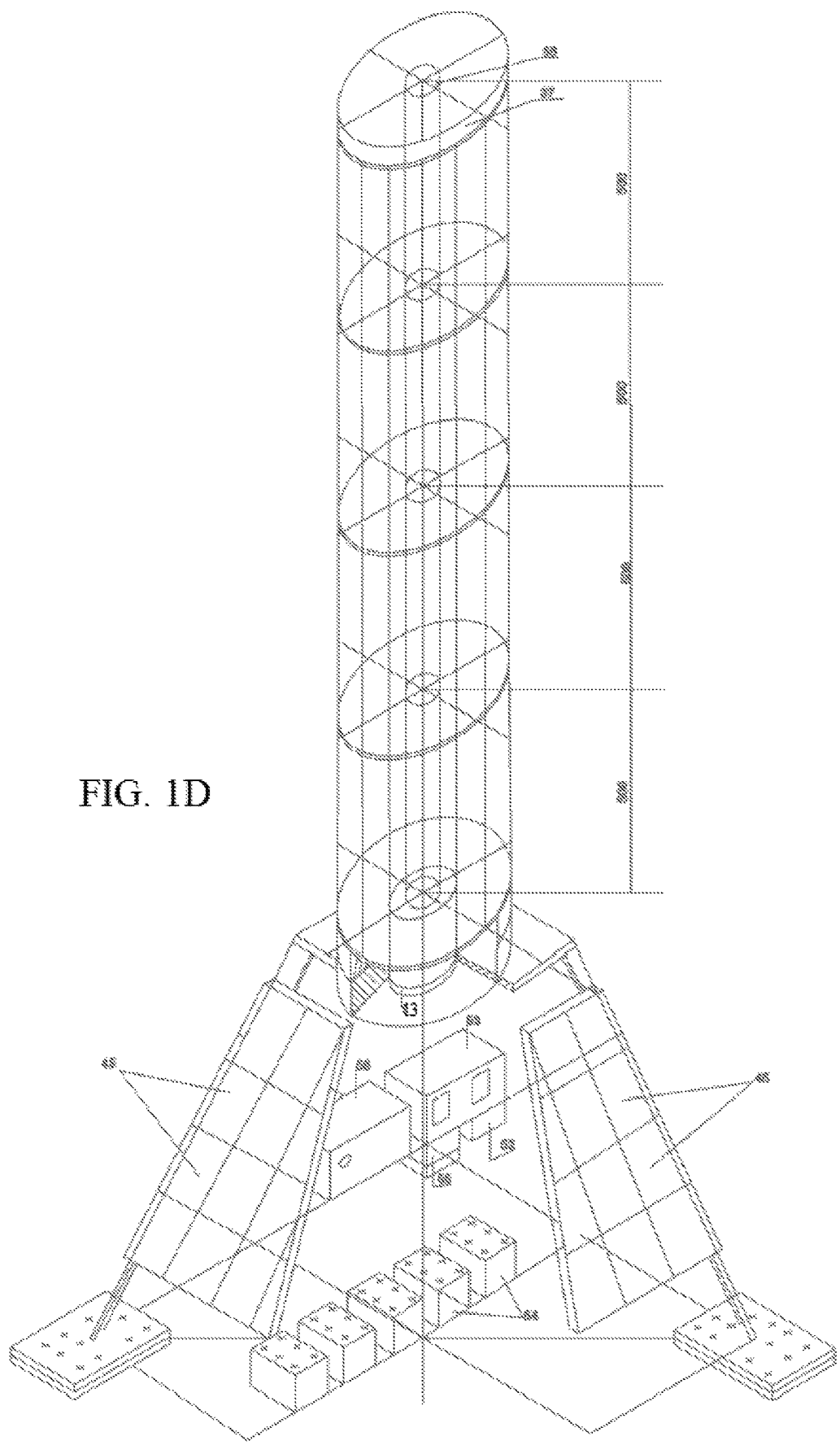
FIG. 1D is a perspective view of the vertical axis wind turbine with a transparent view along the vertical axis.

FIG. 1D illustrates a perspective view of the vertical axis wind turbine 10 with a transparent view along the vertical axis 82. In this view, the quadrangular truncated pyramid shape of the foundation 14 is clearly shown, wherein the solar panels 45 are located on the outside of the foundation 14 and the first and second controllers 52, 55 along with the converter 53 and inverter 56 located within the foundation 14. In this embodiment, the height of one rotor block 40 and one stator block 32 is equal to five hundred millimeters, however again this may vary due to the use and need of the VAWT 10.

Figure 1E:
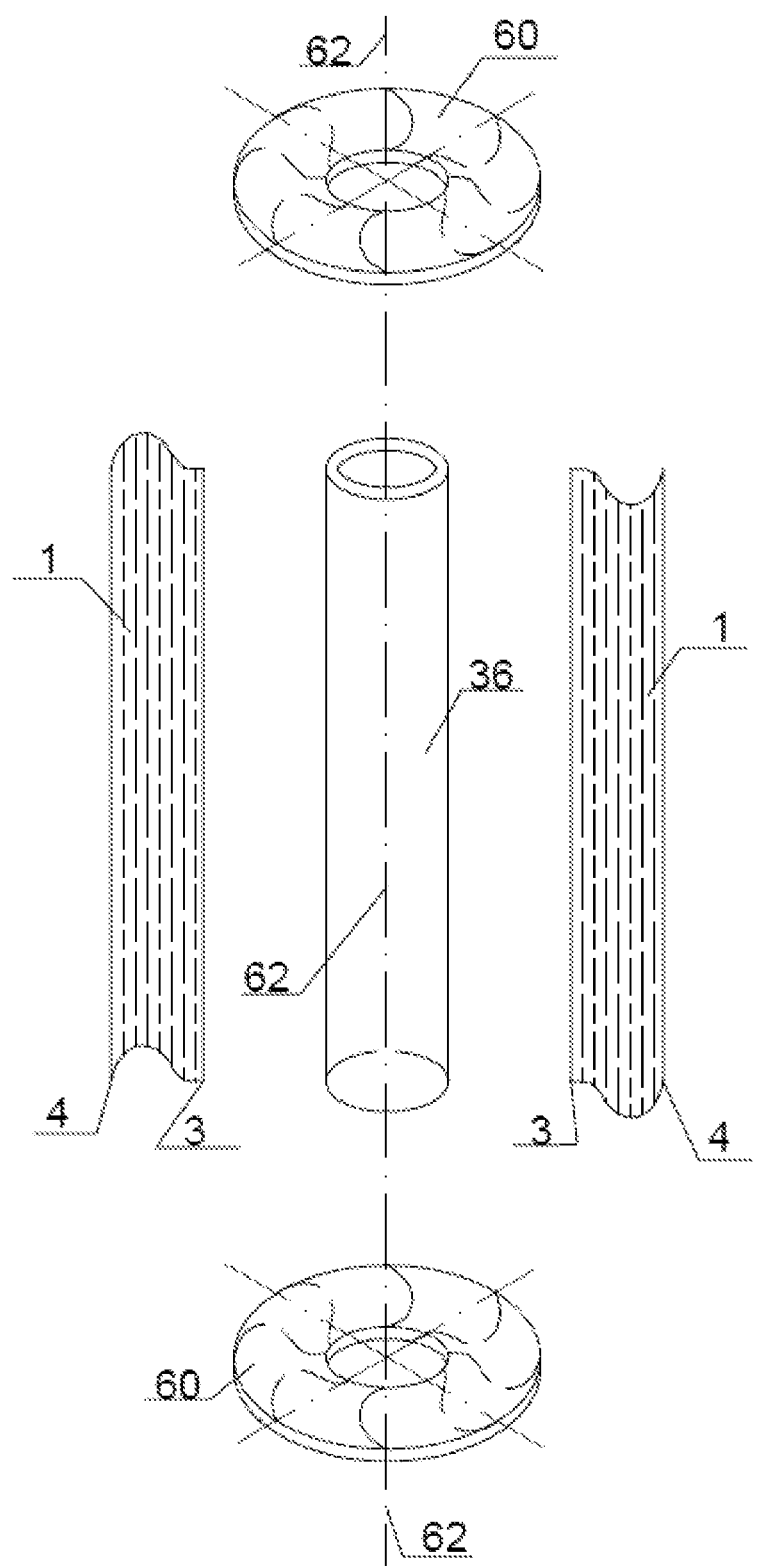
FIG. 1E is an assembly view of one rotor block in the vertical axis.

FIG. 1E is an assembly view of a single rotor blade 1 contained within the rotor block 40, wherein the rotor blade 1 comprises a trailing edge 3 and a leading edge 4.

Figure 2:
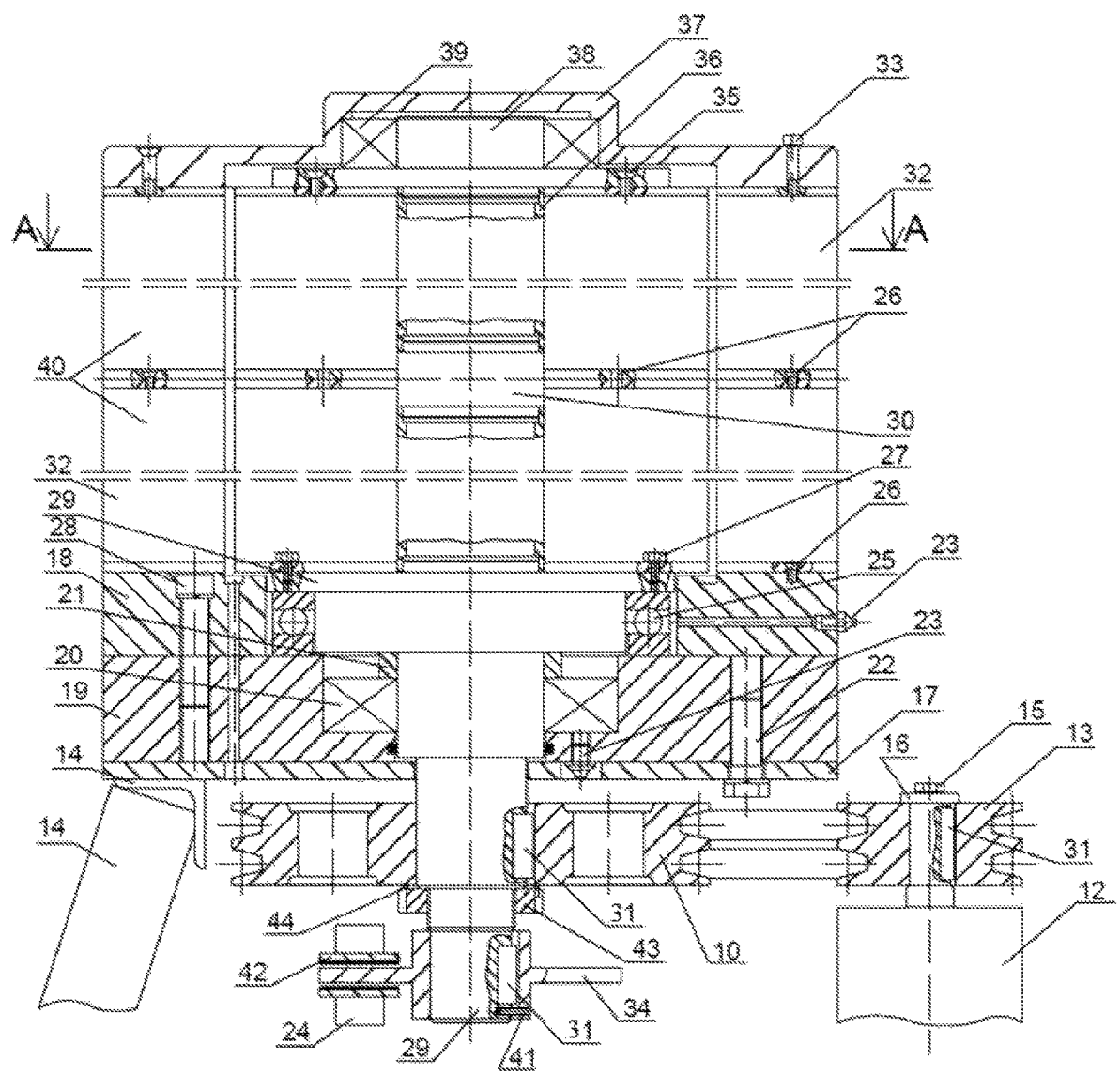
FIG. 2 is a cross sectional view the bottom half of the vertical axis wind turbine showing one rotor block and a base with a generator.

FIG. 2 is a cross sectional view of the bottom half of the vertical axis wind turbine showing one rotor block and the foundation. In this embodiment, the four rotor blocks 40 are fused to the tube 36; each rotor block 40 houses each level of rotor blades 2, wherein the trailing edge 3 of each rotor blade 2 is attached to a pipe 36. A plurality of rotor blocks 40 attach to each other by means of a set of rotor block screws 26, and form a rotary column 70 (see FIG. 4A). The lowermost rotor block 40 is connected via flange shaft bolts 27 to the butt of a wind turbine flanged shaft 29. As the wind exerts a force on the rotor blades 1, the blades 1 rotate the rotary column 70, which is fixed on a lubricated support bearing 25 that ensures smooth rotation of the rotary column 70. The rotary column 70 is installed in the center of a body 19, and the body 19 is fixed on a foundation ring 17 via a set of foundation bolts 22. The final regulation of the rotary column 70 along the vertical axis is realized through a compensation ring 21.

To harvest the power generated by rotation from the rotary column 70, a belt transmission engages a pulley 13, which is fixed to the generator 12 by means of a generator bolt 15. The pulley 13 is secured by a set of special nuts 43 and washers 44, and acts on a dowel 31, which transfers energy produced by the rotary column 70 to the generator 12. The generator 12 is attached to the foundation 14 on the ground and can be easily accessed for maintenance. If necessary, a brake 24 reduces the rotational speed of the rotary column 70. A disc 34 is fixed on the butt of the turbine flanged shaft 29 through a finger 41 and the brake 24 stop the disc 34 with the help of a set of blocks 42.

Preferably, the top end of the rotor block 40 is attached to the flanged shaft butt 38 via rotor block screws 35 that enter into the tube 36 of the rotor block 40. Rotation of the flanged shaft butt 38 is facilitated by the flanged shaft butt bearings 39, which are installed on a stator cover 37 and lubricated with oil 23. The stator cover 37 is attached to the top of the uppermost rotor block 40 by stator cover bolts 33 fixed to the stator portion of the uppermost rotor block 40. The lowermost rotor block 40 is attached to a body cover 18, which is connected to a body 19 by a screw 28. The body 19 is attached to a foundation ring 17 by means of a set of foundation bolts 22.

Figure 3A:
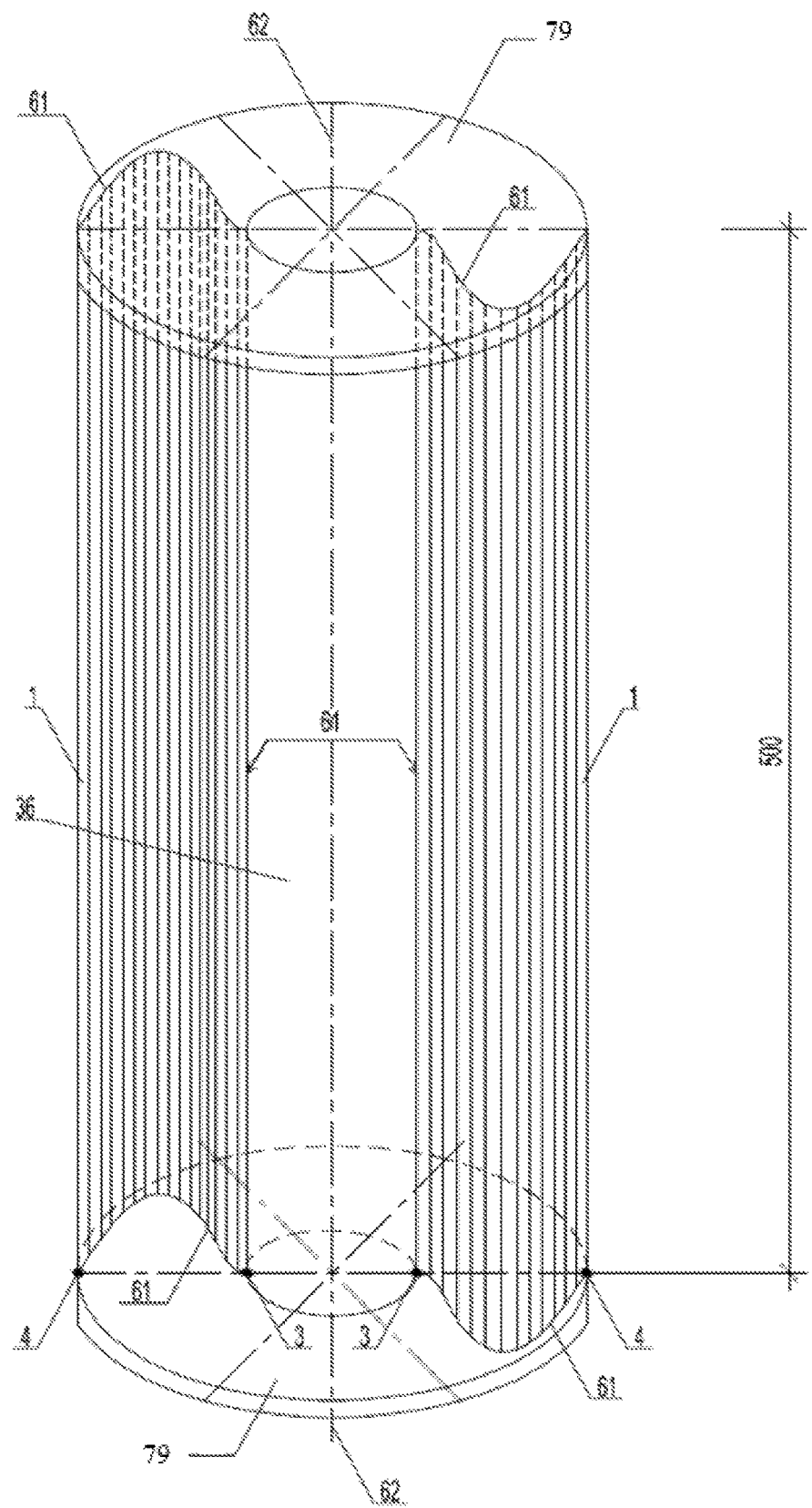
FIG. 3A is a longitudinal section view of one rotor block of the vertical axis wind turbine.

FIG. 3A is a perspective view of two, oppositely positioned rotor blades 1 with the remaining rotor blades 1 not shown for ease of presentation. The lowermost rotor blade 1 is welded, fused, or otherwise permanently attached to a lower ring 55 and the topmost rotor blade is attached through a welding 61, fused, or otherwise permanently attached to an upper ring 79. The rotor blades 1 are also welded, fused, or otherwise permanently attached to the walls of the tube 36 along the entire vertical axis 82 of the tube 36.

Figure 3B:
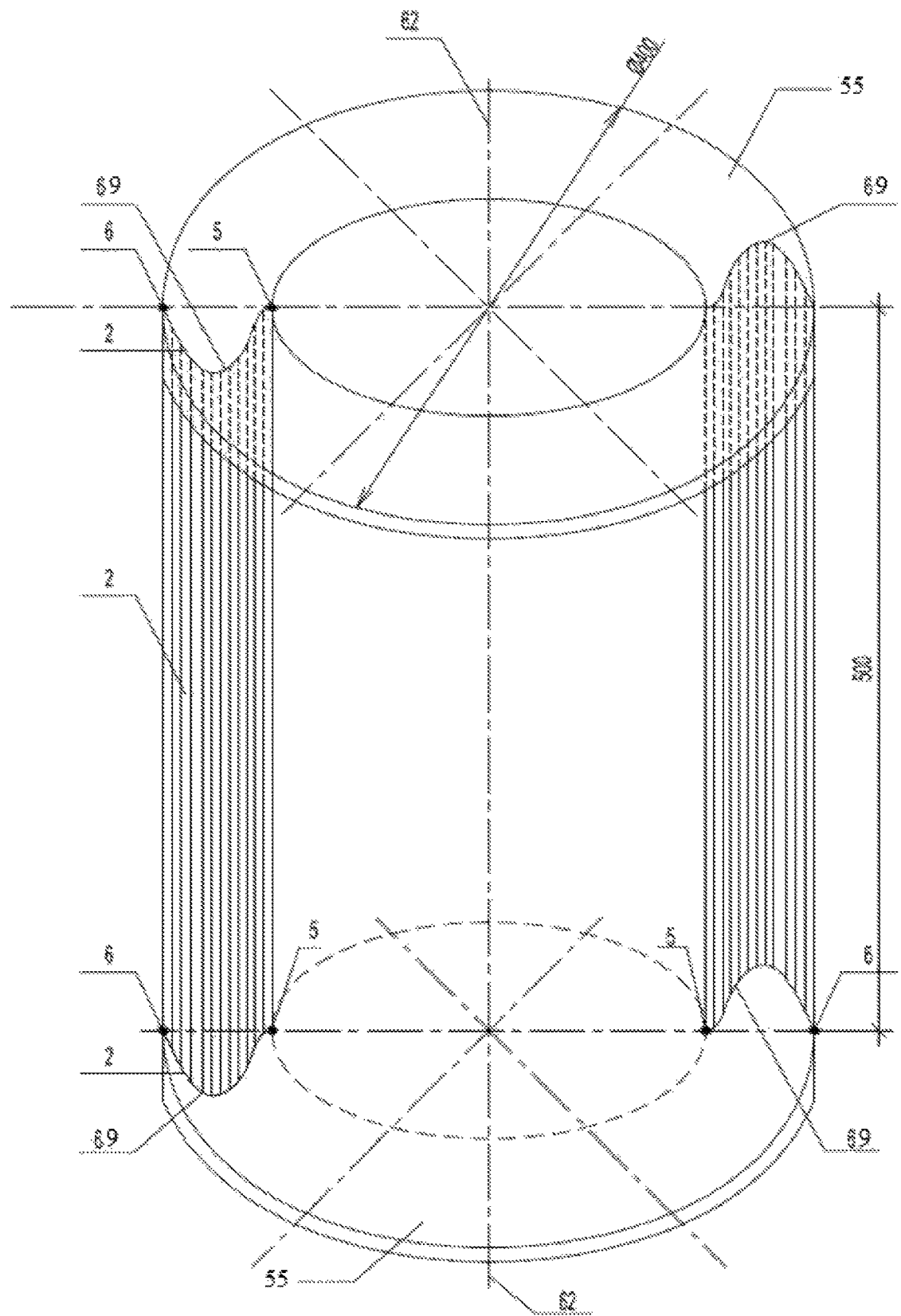
FIG. 3B is a longitudinal section view of a stator block with opposing blades.

FIG. 3B is a perspective view of two, oppositely positioned stator blades 2 with the remaining stator blades 2 not shown for ease of presentation. The lowermost stator blades 2 are welded, fused, or otherwise permanently attached to the lower ring 55 and the uppermost stator blades 2 to a welding 69, fused, or otherwise permanently attached to the upper ring 79.

Figure 4A:
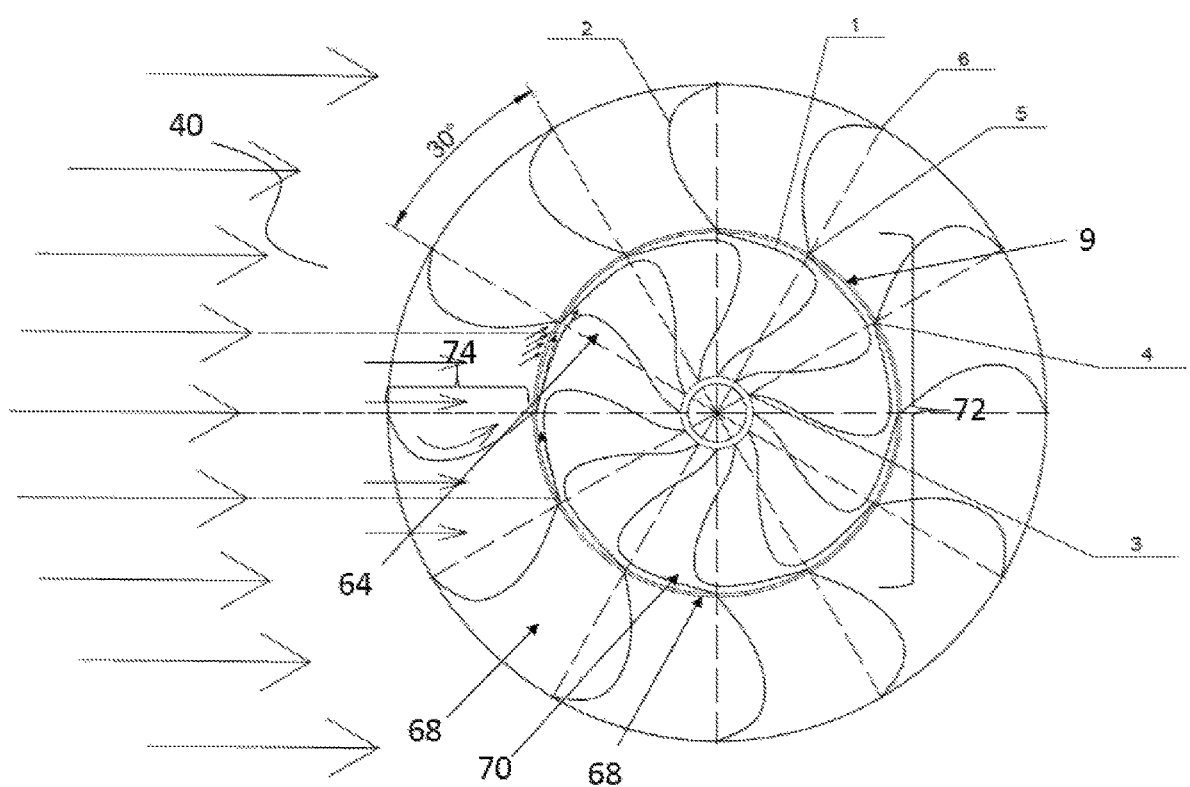
FIG. 4A is a cross sectional view illustrating the location of the rotor and stator blades in one embodiment.

FIG. 4A is a top view of a rotor block 40. In one embodiment, the stator blades 2 are immobile and accelerate airflow into a concave end 64 of the rotor blades 1, which spin and exert a rotational force on the tube 36. The top end of each stator blade 2 is fixed to an immobile upper stator plate and the bottom end of each stator blade is fixed to an immobile lower stator plate 68. The upper stator plate and lower stator plate 68 are oriented parallel to one another, wherein each stator blade 2 directs lateral air flow to into the rotary column 70. The vertical axis of rotation allows a generator 12 (shown in FIG. 1C) and directing equipment to be situated on the ground, allowing easy access for maintenance and repair.

In another embodiment, twelve stator blades 2 equidistantly spaced thirty degrees apart surround twelve equidistantly spaced rotor blades 1. A leading edge 6 of the stator blade 2 defines an external diameter 72 of the rotor block 40. A stator blade trailing edge 5 and the rotor blade leading edge 4 are separated by a minimal gap 9. In one embodiment, the minimal gap 9 further comprises a 2-2.5 mm separation between the stator blade trailing edge 5 and the rotor blade leading edge 4. The rotor blade trailing edge 3 is fixed to a tube 36, which encircles an outer wall of the pipe 36. The rotor blade leading edge 4 further comprises a continuation of the corresponding stator blade trailing edge 5, which promotes the flow of laminar air into the rotary column 70. A stator diameter 74, when added on both sides, comprises half of the VAWT 10 external diameter 72.

Figure 4B:
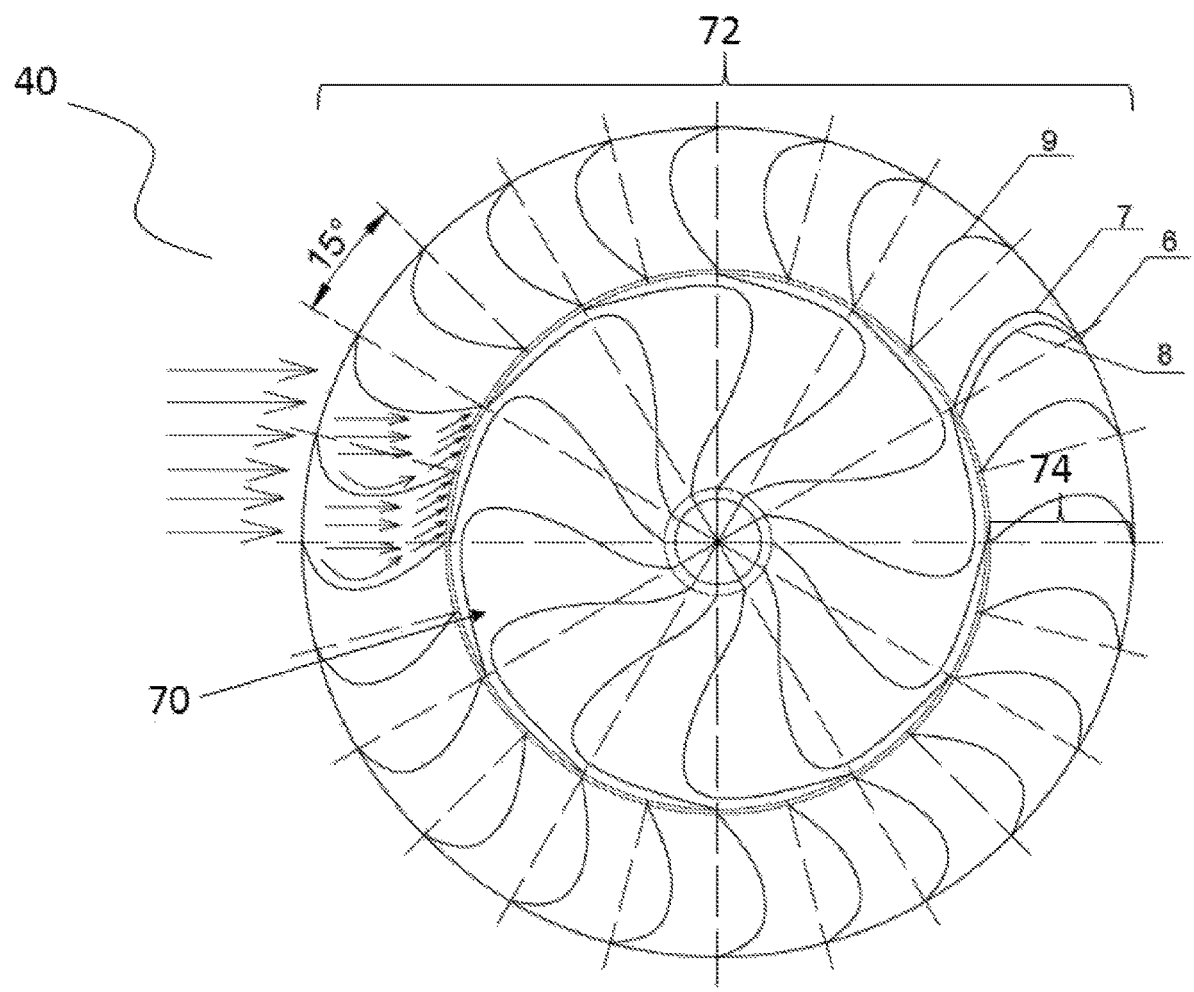
FIG. 4B is a cross sectional view illustrating the relative positions of the rotor and stator blades in another embodiment.

FIG. 4B is a top view of one embodiment of the rotor block 40 wherein there are twenty-four stator blades 2 and twelve rotor blades 1, and the stator blades are equidistantly disposed at a 15 degree angle. Increasing the number of stator blades 2 increases the velocity of airflow into the rotary column 70, which increases the energy conversion efficiency and ecological safety, and allows the user to decrease the overall size of the vertical axis wind turbine 10 while producing the same amount of electrical power. The decrease in size is accomplished by decreasing the stator diameter 74 to one quarter of the external diameter 72 of the VAWT 10. An external surface 7 and an internal surface 8 of the blade are identical along the whole outline which increases the manufacturability of the blades, promotes the mass production of wind turbines and decreases the resistance during air fairness.

Figure 4C:
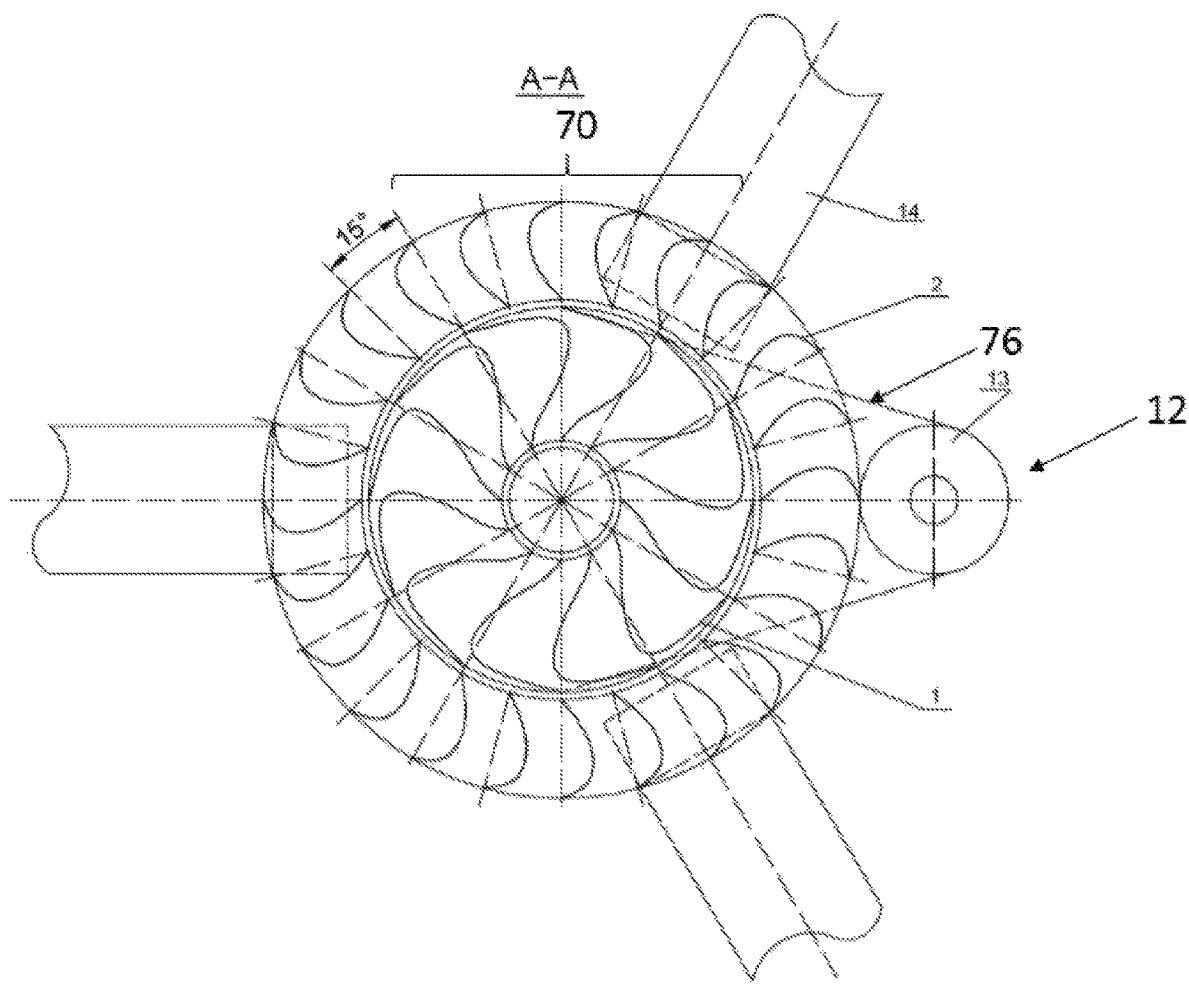
FIG. 4C is a cross sectional view of the vertical axis along line A-A shown in FIG. 2.

FIG. 4C is a top perspective view of a rotor block 40 in proximity to the generator 12 and the foundation 14 for the VAWT 10. In one embodiment, a band 76 attaches the rotary column 70 to the pulley 13. As the rotary column 70 is turned by the wind, it pulls the band 76 and pulley 13 system, which acts upon a dowel 31 connected to the generator 12.

Figure 5:
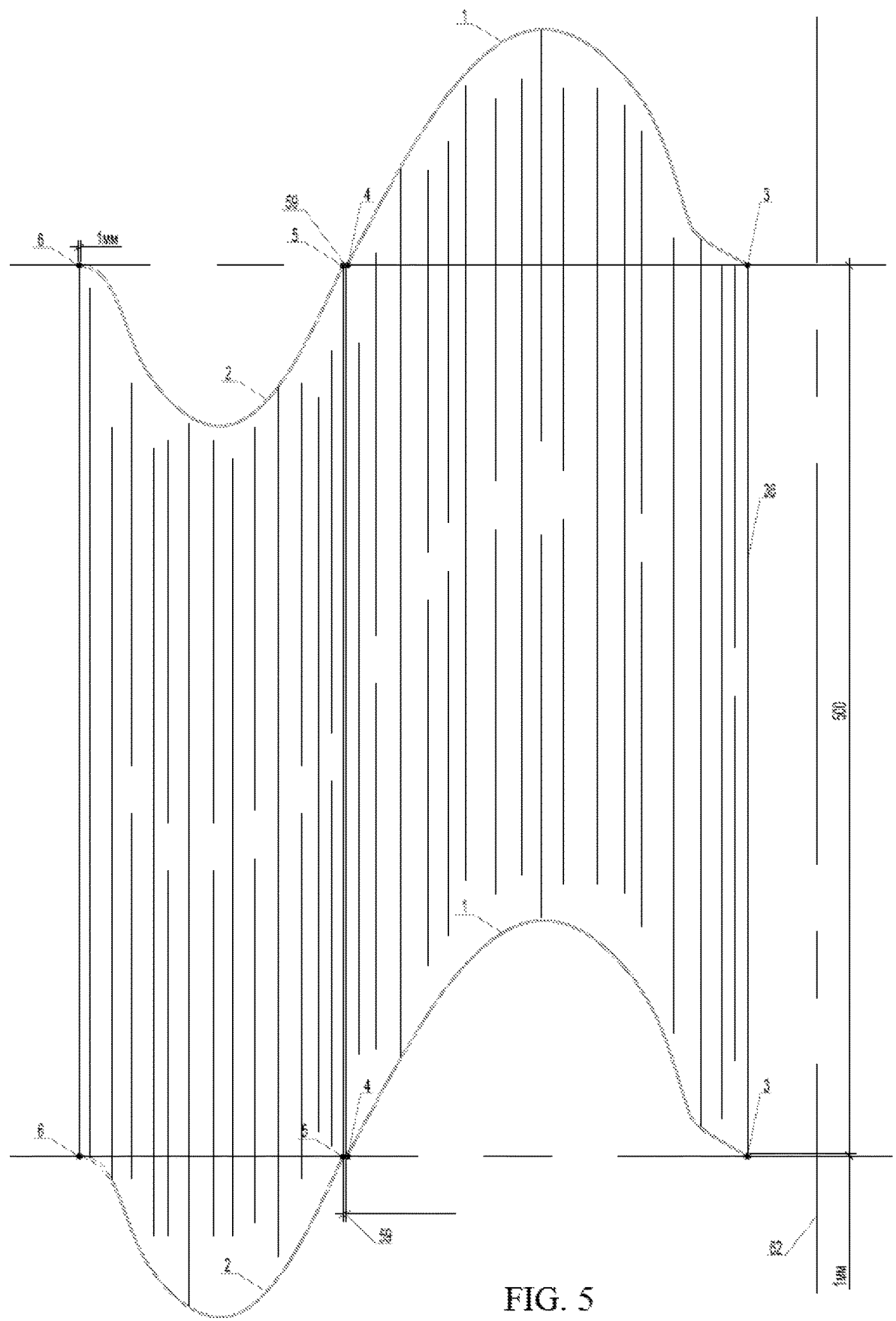
FIG. 5 illustrates one embodiment of a geometric design of one rotor blade and one stator blade contained within a rotor block in the vertical axis.

FIG. 5 represents a view of one stator blade 2 and one corresponding rotor blade 1 with a minimal gap 59 of approximately two millimeters.

Figure 6:
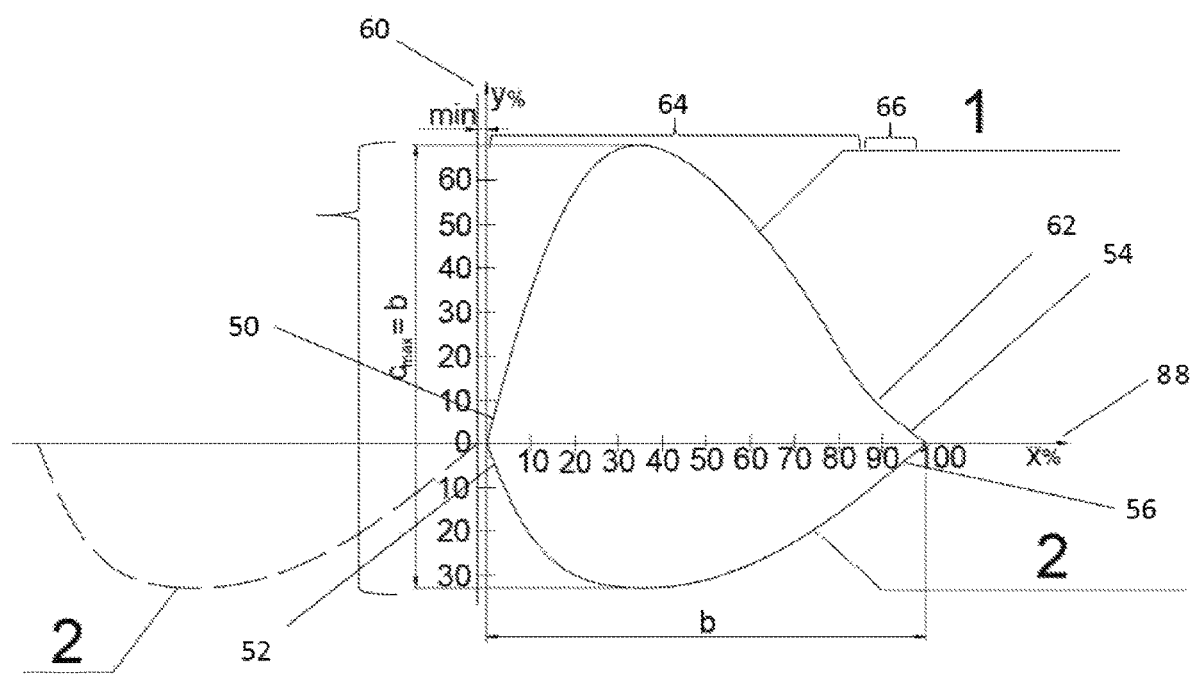
FIG. 6 illustrates a graphical representation of an edgy profile of the rotor and stator blades.

FIG. 6 is a graphical representation of the edge profile of a rotor blade 1 and corresponding stator blade 2, wherein 100% relative depth comprises $C_{max}$=b. The relative width of the profile c is the relation of the maximum width of the profile, $C_{Max}$ to its chord b, measured in the percents:

$$c=C_{Max}/b\times 100\%$$

In the chord b is the section, connecting the end points of the profile. The rotor blade leading edge 4 and the stator blade leading edge 6 lie at the origin of the graph. The rotor blade trailing edge 3 and the stator blade trailing edge 5 lie at one hundred percent of a length 88, represented by the x-axis. In one embodiment, a depth 60 of the rotor blade 1 is seventy percent of the length 88 of the rotor blade 1, and the depth 60 of the stator blade 2 is thirty percent of the length 88 of the stator blade 2, wherein both the rotor blade 1 and stator blade 2 are of equivalent length 88, and the sum of the stator blade depth 60 and rotor blade depth 60 is equivalent to the length 88 of the rotor blade 1 and the length 88 stator blade 2. In another embodiment, the rotor blade 1 comprises an inflection point 62 near eighty-five percent of the rotor blade 1 length 88, wherein along one side the rotor blade 1, approximately eighty-five percent of the length 88 comprises a concave end 64 and the remaining fifteen percent of the length 88 comprises a convex end 66. The concave end 64 receives air directed by the stator blades 2 and the convex end 66 facilitates sturdy attachment of the rotor blade to the tube 36 (shown in FIG. 13).

Figure 7:
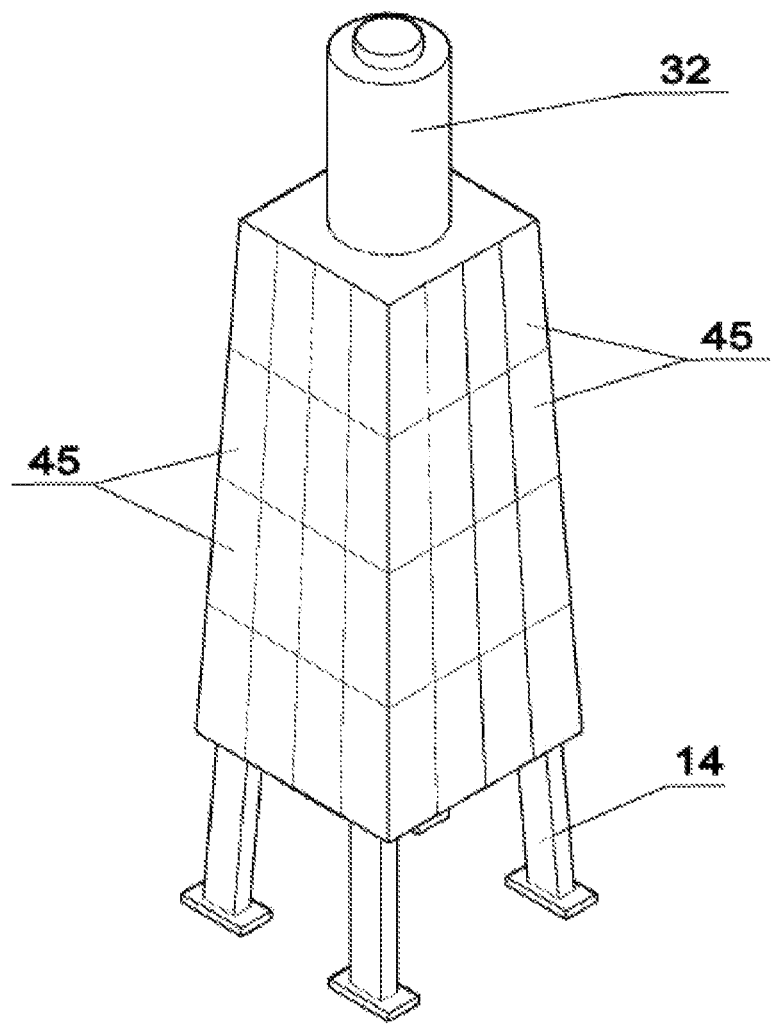
FIG. 7 is a perspective view of a foundation of the vertical axis wind turbine.

FIG. 7 is a perspective view of the foundation 14 comprising a last block 32, and plurality of solar panels 45. The lateral surfaces of the truncated pyramid comprise a plurality of rectangular solar panels, which provide the power necessary to initiate rotation of the turbines.

What is claimed is:

1. A vertical axis wind turbine (VAWT) comprising:
a set of rotor blocks arranged on a vertical axis, wherein each individual rotor block is interconnected through a set of screws;
a flanged shaft, wherein an end of the uppermost rotor block is fixed to the flanged shaft through a set of flanged shaft screws;
a tube contained within the set of rotor blocks, wherein the tube receives the flanged shaft and extends from a top of the uppermost rotor block to a bottom of a lowermost rotor block and is connected via a set of flange shaft bolts to a butt of a wind turbine flanged shaft;
a body, wherein the body is fixed on a foundation ring via a set of foundation bolts;
a body cover connected to the body and the lowermost rotor block;
a rotatory column installed in a center of the body and fixed on a lubricated support bearing to enable rotation of the rotatory column wherein the final regulation of the rotatory column along the vertical axis is accomplished through a compensation ring;
a set of stator blocks, wherein the set of stator blocks surround the set of rotor block and are interconnected through the set of screws and are motionlessly connected to a closure head through the set of screws;
a foundation to support the set of rotor blocks and set of stator blocks;
a set of rotor blades contained within each rotor block, wherein each rotor blade comprises a leading edge and a trailing edge;
a set of stator blades contained within each stator block, wherein each stator blade comprises a leading edge and a trailing edge; and
wherein a surface of each rotor blade is made respectively of a top (positive) part of the rotor's blade edgy profile, and a surface of each stator blade is made respectively of a bottom (negative) part of the edgy profile, deposed along a horizontal axis and the blades are placed along the rotor and stator radius evenly on one line in the horizontal plane and with a minimal gap in the vertical plane and the leading edge of the rotor blade surface is the continuation of the trailing edge of the stator blade surface that an edgy profile butt is formed on one axial line along the radius in a static position and the stator and rotor blades are perpendicular to the rotation axis along with having an identical length and equal in quantity.

2. The VAWT of claim 1 wherein the foundation further comprises:
an assembly of metallic channel bars welded to each other through a foundation ring;
a series of insert-fixing-plates anchor the foundation to the ground by means of a set of anchor nuts and a set of anchor bolts; and
a plurality of solar panels attached to the sides of the foundation which rotate about a hinge pin.

3. The VAWT of claim 1 further comprising a first controller located within the foundation to receive electric power generated by the solar panels, wherein part of the electric power is passed to an inverter and the remaining power is directed to a series of accumulators to the store the remaining power.

4. The VAWT of claim 3 further comprising a generator, wherein the electricity generated by the VAWT via the generator passes to a second controller, wherein part of the electric power is passed to a converter and the remaining power is directed to the series of accumulators to the store the remaining power.

5. The VAWT of claim 1, wherein a minimal gap exists between the set of rotor blocks and the set of stator blocks.

6. The VAWT of claim 1, wherein a closure is motionlessly fixed on a last upper block of the set of stators through a set of bolts and a beacon is located on the closure to characterize a height of the VAWT which includes an LED lamp to illuminate the presence of the VAWT.

7. The VAWT of claim 1, wherein an upper ring is fixed on the end of the flanged shaft through the set of flanged shaft screws.

8. The VAWT of claim 1, wherein the trailing edge of each rotor blade is attached to the tube.

9. The VAWT of claim 1, wherein to harvest the power generated from the rotary column, a belt transmission engages a pulley which is fixed to the generator, and the pulled acts on a dowel which transfers energy from the rotary column to the generator.

10. The VAWT of claim 1, wherein a disc is fixed on the butt of the wind turbine flanged shaft through a finger, and wherein a brake stops the disc with a set of blocks to reduce the rotational speed of the rotary column.

11. The VAWT of claim 1, wherein the stator blades are immobile and accelerate airflow into a concave end of the rotor blade which spin and exert a rotational force on the tube.

12. The VAWT of claim 11, wherein a top end of each stator blade is fixed to an immobile upper stator plate and a bottom end of each stator blade is fixed to an immobile lower stator plate.

13. The VAWT of claim 12, wherein the upper stator plate and the lower stator plated are oriented parallel to one another.

14. The VAWT of claim 1, where're twelve stator blades are equidistantly spaced thirty degrees apart in each stator block and surround twelve equidistantly spaced rotor blades located in each rotor block.

15. The VAWT of claim 1, wherein the rotor blade trailing edge 3 is fixed to the tube, which encircles an outer wall of the pipe and the rotor blade leading edge further comprises a continuation of the corresponding stator blade trailing edge which promotes the flow of laminar air into the rotary column.

16. The VAWT of claim 1, wherein the rotor blade trailing edge and the stator blade trailing edge lie at one hundred percent of a length.

17. The VAWT of claim 16, wherein a depth of the rotor blade is seventy percent of the length of the rotor blade, and the depth of the stator blade is thirty percent of the length of the stator blade, wherein both the rotor blade and stator blade are of equivalent length, and the sum of the stator blade depth and rotor blade depth is equivalent to the length of the rotor blade and the length stator blade.

18. The VAWT of claim 16, wherein the rotor blade comprises an inflection point near eighty-five percent of the rotor blade length, wherein along one side the rotor blade, approximately eighty-five percent of the length comprises a concave end and the remaining fifteen percent of the length comprises a convex end.

19. The VAWT of claim 18, wherein the concave end receives air directed by the stator blades and the convex end facilitates sturdy attachment of the rotor blade to the tube.

\* \* \* \* \*